LEDY & BOYERS.
Preventing Cattle Entering Gardens.
No. 28,286.  Patented May 15, 1860.
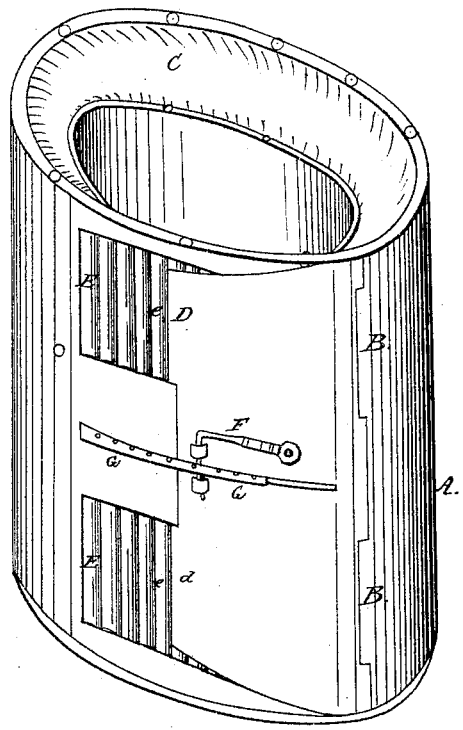
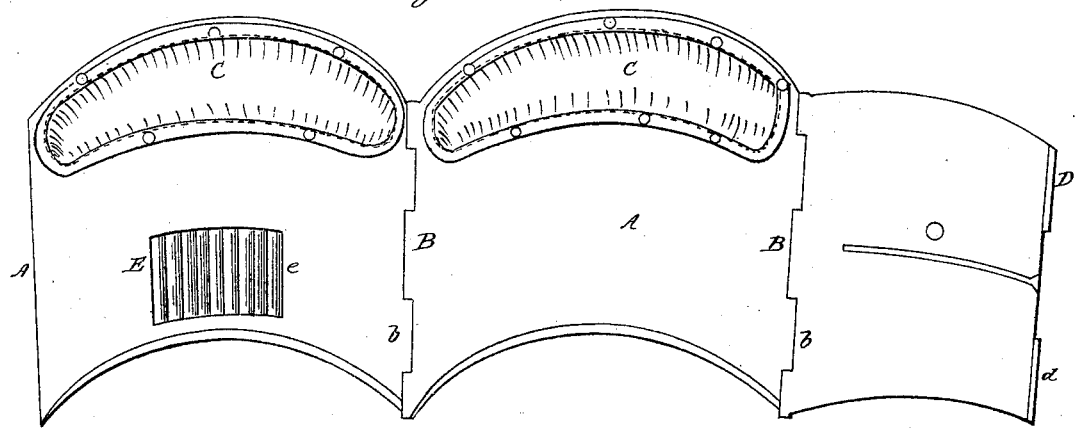
Witnesses:
J. P. Emmert
John B. Christian
Inventor:
John P Ledy
William Boyers

UNITED STATES PATENT OFFICE.

JOHN P. LEDY AND WILLIAM BOYERS, OF MOUNT CARROLL, ILLINOIS.

APPARATUS FOR BREACHY CATTLE.

Specification of Letters Patent No. 28,286, dated May 15, 1860.

*To all whom it may concern:*

Be it known that we, JOHN P. LEDY and WILLIAM BOYERS, of Mount Carroll, in the county of Carroll, State of Illinois, have invented a new mode of preventing cattle and horses from breaking over inclosures and to cause cattle to come home in the evening, called a delinquent and breach preventer; and we do hereby declare that the following is a full and exact description thereof, reference being had to the accompanying drawings, and to the letters of reference marked thereon.

Figure 1 is a perspective, and Fig. 2 a sectional view of the same.

The same letters of reference apply equally to both Figs. 1 and 2.

The nature of our invention consists in providing a metallic sheath, A, constructed with suitable hinges, B, $b$, so that it can be opened and closed conveniently, in order to apply it readily to the knee joints of the fore legs of cattle and horses.

To enable any skilful artist to make and use our invention, we will proceed to describe its construction.

We construct our delinquent, and breach preventer, of sheet iron, or any other suitable substance, made in such a manner, that it can be clasped around the joints of the forelegs of cattle, horses, &c., as at Fig. 1, of length sufficient, to prevent it from bending the joint only sufficient to walk easily, and provided with a pad C, on the inside near the top, for the purpose of confining it above the knee joint, and keeping it from slipping down, the lower part of the sheath A, is large enough to enable cattle to walk with facility; the sheath is clasped together with a double clasp, as at D, $d$, graduated by a number of perpendicular slots, or openings E, $e$, in the sheath, to accommodate it to different sized cattle, &c. which is further secured by a catch, F, passing through a horizontal strip of metal perforated with holes, and attached to the sheath, as shown at G. Cattle cannot lay down with the sheath on, therefore, they will come home to have it taken off.

What we claim as our invention, and desire to secure by Letters Patent, is—

The metallic sheath, A, in combination with the pad, C, and clasp, D, constructed in the manner, and for the purpose specified.

JOHN P. LEDY.
WILLIAM BOYERS.

Witnesses:
J. P. EMMERT,
JOHN B. CHRISTIAN.